Aug. 14, 1945. U. WEISS ET AL 2,382,759
MICROMETER GAUGE
Filed May 27, 1941
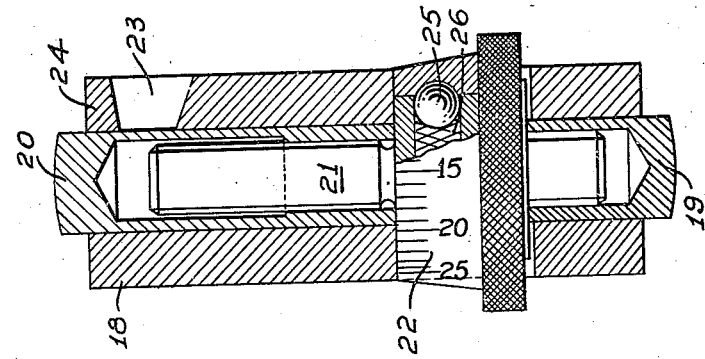
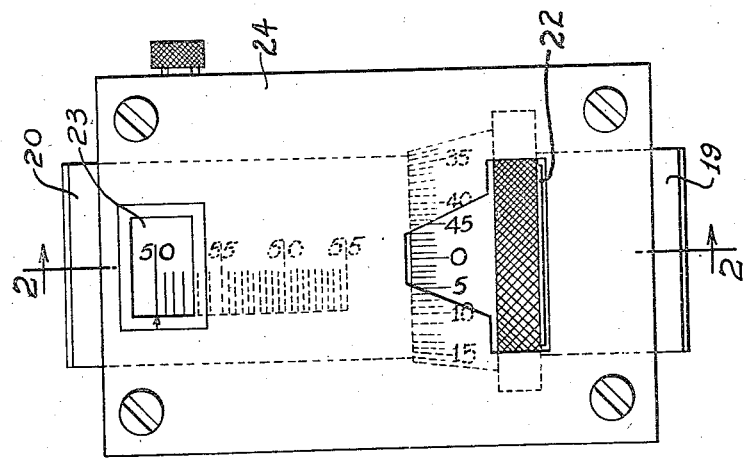
Inventors
U. WEISS & D. LEONE
By
Attorney.

Patented Aug. 14, 1945

2,382,759

UNITED STATES PATENT OFFICE 2,382,759

MICROMETER GAUGE

Ugo Weiss, Milan, and Domenico Leone, Turin, Italy; vested in the Alien Property Custodian Application May 27, 1941, Serial No. 395,500
In Italy February 27, 1940

1 Claim. (Cl. 33—164)

This invention relates to a micrometer gauge and more particularly to an internal gauge provided with coarse and vernier graduations.

A first object of the invention is to provide a micrometer gauge which may be easily adjusted to read zero in its zero position.

Another object of the invention is the provision in a micrometer gauge of a vernier drum which is arranged to be frictionally adjustable with respect to the micrometer screw to not only permit setting of the gauge to its zero position but also allow slippage of the drum to protect the gauge when too great a torque is applied thereto.

With these and other objects in view, reference is made to the accompanying drawing and the following specification for a more complete understanding of the invention, and in which:

Fig. 1 is a plan view of a preferred embodiment of the gauge of the invention, and Fig. 2 is a vertical section taken on the line 2—2 of Fig. 1, certain of the parts being shown in elevation.

Similar reference numerals denote corresponding parts in each of the figures of the drawing.

Referring to the two figures of the drawing, there is shown therein a micrometer gauge comprising a housing including a back plate 18 and a front plate 24 which can be secured together by screws or other means. The back plate 18 is provided with a groove in which two slides 19 and 20 are supported so that they may be freely extended or retracted by means of a micrometer screw 21, the slide 20 being provided with graduations which may be viewed through an aperture 23 in the front plate 24.

The micrometer screw 21 is provided with a cavity therein in which is placed a spring 26 which presses a ball 25 against an internal surface of a vernier drum 22 mounted upon the micrometer screw, the drum 22 partly projecting through the front plate 24 and back plate 18 and being provided with graduations thereon and a knurled edge to permit manual rotation thereof.

In use, the drum 22 may be rotated with respect to the micrometer screw 21 by reason of the frictional connection therebetween provided by the spring 26 and the ball 25. This frictional connection has a dual purpose in that it permits calibration of the gauge by adjustment of the vernier drum to its zero position and also allows the drum 22 to slip with respect to the micrometer screw 21 and thus protect the gauge against damage which might be engendered by the application of too great a torque to the vernier drum.

After the gauge has been calibrated, internal measurements may be made by rotating the drum 22 until the two slides 19 and 20 have been extended sufficiently to engage opposite internal surfaces of the object to be measured. The coarse measurement may then be read from the graduations on the slide 20 through the aperture 23, the drum 22 being viewed through the aperture in the front plate 24 to determine the vernier measurement.

Various changes in the form, proportion and minor details of construction may be resorted to without departing from the principles of the invention as defined by the appended claim.

Having thus described the invention, what is claimed as new and is desired to be secured by Letters Patent of the United States, is:

A gauge comprising a housing, extensible measuring means in said housing, a micrometer screw for operating said measuring means, a graduated drum having an internal surface mounted on said micrometer screw, a spring-pressed ball mounted in said micrometer screw and engaging the internal surface of the drum, and an aperture in said housing for observing the graduations on said drum.

UGO WEISS.
DOMENICO LEONE.